(12) United States Patent
Kwon

(10) Patent No.: US 12,351,154 B2
(45) Date of Patent: Jul. 8, 2025

(54) BRAKE SYSTEM AND VEHICLE HAVING THE SAME

(71) Applicant: HL MANDO CORPORATION, Pyeongtaek-si (KR)

(72) Inventor: Gijun Kwon, Seongnam-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 125 days.

(21) Appl. No.: 18/136,949

(22) Filed: Apr. 20, 2023

(65) Prior Publication Data

US 2023/0339443 A1 Oct. 26, 2023

(30) Foreign Application Priority Data

Apr. 20, 2022 (KR) .......................... 10-2022-0048604

(51) Int. Cl.
  *B60T 8/32* (2006.01)
  *B60T 7/04* (2006.01)
  (Continued)

(52) U.S. Cl.
  CPC .............. *B60T 8/326* (2013.01); *B60T 7/042* (2013.01); *B60T 13/745* (2013.01); *B60T 17/22* (2013.01);
  (Continued)

(58) Field of Classification Search
  CPC ........ B60T 8/326; B60T 7/042; B60T 13/745; B60T 17/22; B60T 2210/30;
  (Continued)

(56) References Cited

U.S. PATENT DOCUMENTS 6,341,947 B1 * 1/2002 Otomo ...................... B60T 8/94
                                                              303/11
6,412,882 B1 * 7/2002 Isono ...................... B60T 8/367
                                                              903/952

(Continued)

FOREIGN PATENT DOCUMENTS

| JP | 2010-269771 A | 12/2010 |
| KR | 10-2019-0088667 A | 7/2019 |
| KR | 10-2020-0077172 A | 6/2020 |

*Primary Examiner* — Joseph J Dallo
(74) *Attorney, Agent, or Firm* — Harvest IP Law, LLP

(57) ABSTRACT

The present disclosure relates to a brake system and a vehicle having the same.
The brake system includes a pedal force detector configured to output a pedal force signal corresponding to pressing of a brake pedal of a vehicle, a pressure detector configured to output a pressure signal corresponding to a pressure of a flow path connected to a wheel cylinder of the vehicle, a motor configured to provide a pressure of a pressurizing medium to the wheel cylinder, and a processor configured to acquire pressure information of the flow path based on the pressure signal of the pressure detector when receiving the pedal force signal of the pedal force detector, acquire a difference value between the pressure of the flow path and a target pressure corresponding to the pedal force signal based on the pressure information of the flow path and pre-stored target pressure information, acquire compensation pressure information based on the pressure information of the flow path and the pre-stored target pressure information when the acquired difference value is greater than or equal to a reference value, and control the motor based on the acquired compensation pressure information.

15 Claims, 7 Drawing Sheets

(51) Int. Cl.
*B60T 13/74* (2006.01)
*B60T 17/22* (2006.01)

(52) U.S. Cl.
CPC ....... *B60T 2210/30* (2013.01); *B60T 2220/04* (2013.01); *B60T 2270/82* (2013.01); *B60T 2270/88* (2013.01)

(58) Field of Classification Search
CPC ............. B60T 2220/04; B60T 2270/82; B60T 2270/88; B60T 8/4081; B60T 13/662; B60T 13/686; B60T 8/409; B60T 13/147; B60T 8/171; B60T 8/172; B60T 13/588; B60T 17/221; B60T 2270/402; B60T 2270/84; B60Y 2400/81

See application file for complete search history.

(56) References Cited

U.S. PATENT DOCUMENTS

| | | | | |
|---|---|---|---|---|
| 6,739,676 | B1* | 5/2004 | Isono | B60T 13/575 303/115.3 |
| 2005/0110337 | A1* | 5/2005 | Zheng | B60T 8/4072 303/10 |
| 2006/0066146 | A1* | 3/2006 | Otomo | B60T 13/147 303/151 |
| 2008/0236959 | A1* | 10/2008 | Hashida | B60T 8/4077 188/72.2 |
| 2009/0243382 | A1* | 10/2009 | Yamauchi | B60T 8/36 303/155 |
| 2011/0077832 | A1* | 3/2011 | Niino | B60T 13/662 701/70 |
| 2013/0026817 | A1* | 1/2013 | Morishita | B60T 13/686 303/3 |
| 2013/0234500 | A1* | 9/2013 | Morishita | B60W 10/08 303/3 |
| 2019/0077386 | A1* | 3/2019 | Kubota | B60T 13/662 |
| 2020/0369248 | A1* | 11/2020 | Marx | B60T 13/686 |

* cited by examiner

BRAKE SYSTEM AND VEHICLE HAVING THE SAME

CROSS-REFERENCE TO RELATED APPLICATION

This application claims the benefit of Korean Patent Application No. 10-2022-0048604, filed on Apr. 20, 2022 in the Korean Intellectual Property Office, the disclosure of which is incorporated herein by reference.

BACKGROUND

1. Field

Embodiments of the present disclosure relate to a brake system for improving braking performance and a vehicle having the same.

2. Description of the Related Art

A vehicle is a machine that travels by driving wheels for the purpose of transporting people or cargo. The vehicle may be provided with a power device, a brake device, and a steering device necessary for traveling and further provided with various safety devices for the safety of the user and occupants.

Various devices provided in a vehicle have an electronic control unit for performing each function, and each electronic control unit has the same hardware for performing the same function for the power supplier, a controller, a communicator, and the like.

As described above, since the same hardware is redundantly installed to the vehicle, there are problems that manufacturing costs increase and an occupied area increase in the vehicle due to an increase in volume.

In addition, since various devices are installed separately and are provided in different housings, separate housings needs to be manufactured, and thereafter, since each electronic control unit needs to be mounted on each housing, there are problems that a long time and high manpower are required.

Therefore, recently, research on technologies for allowing one electronic control unit to control different functions by integrating a plurality of electronic control units for controlling different functions into one has been conducted.

For example, there is an integrated dynamic brake (IDB) that integrates an electric booster for driving a piston through a motor to generate a hydraulic pressure and an electronic control unit of electronic stability control (ESC) for preventing a vehicle from slipping while traveling.

The IDB has a problem that braking performance corresponding to a pedal force of the same brake pedal varies depending on external temperature. This will be described with reference to FIGS. 1A and 1B.

As shown in FIG. 1A, it can be seen that a stroke of the brake pedal corresponding to a force (i.e., a pedal force) applied to the brake pedal is different depending on whether the external temperature is room temperature or a low temperature. As shown in FIG. 1B, it can be seen that a target pressure of a wheel cylinder is proportional to the stroke of the brake pedal.

Referring to FIGS. 1A and 1B, it can be seen that the target pressure of the wheel cylinder corresponding to the pedal force of the brake pedal is different depending on whether the external temperature is room temperature or a low temperature.

SUMMARY

Therefore, it is an aspect of the present disclosure to provide a brake system and a vehicle having the same, which acquire compensation pressure information based on target pressure information and present target pressure information at a first temperature or higher and generate a braking force based on the acquired compensation pressure information and the present target pressure information.

Additional aspects of the disclosure will be set forth in part in the description which follows and, in part, will be obvious from the description, or may be learned by practice of the disclosure.

In accordance with one aspect of the present disclosure, a brake system includes a pedal force detector configured to output a pedal force signal corresponding to pressing of a brake pedal of a vehicle, a pressure detector configured to output a pressure signal corresponding to a pressure of a flow path connected to a wheel cylinder of the vehicle, a motor configured to provide a pressure of a pressurizing medium to the wheel cylinder, and a processor configured to acquire pressure information of the flow path based on the pressure signal of the pressure detector when receiving the pedal force signal of the pedal force detector, acquire a difference value between the pressure of the flow path and a target pressure corresponding to the pedal force signal based on the pressure information of the flow path and pre-stored target pressure information, acquire compensation pressure information based on the pressure information of the flow path and the pre-stored target pressure information when the acquired difference value is greater than or equal to a reference value, and control the motor based on the acquired compensation pressure information.

The brake system may further include a temperature detector. The processor may identify whether a current temperature is higher than or equal to a first temperature based on a temperature signal of the temperature detector when receiving the pedal force signal of the pedal force detector, acquire the pressure information of the flow path based on the pressure signal of the pressure detector when identifying that the current temperature is higher than or equal to the first temperature, and store the acquired pressure information of the flow path as the target pressure information.

The processor may control the motor based on the pedal force signal of the pedal force detector when identifying that the current temperature is higher than or equal to the first temperature.

The brake system may further include a temperature detector. The processor may identify whether a current temperature is lower than a second temperature based on a temperature signal of the temperature detector when receiving the pedal force signal of the pedal force detector, and control the motor based on the acquired compensation pressure information when identifying that the current temperature is lower than the second temperature.

The processor may control the motor based on the pedal force signal of the pedal force detector when identifying that the acquired difference value is smaller than the reference value.

The processor may control the motor to generate a compensation pressure from a first time point at which the acquired difference value is greater than or equal to the reference value.

The processor may control the motor to linearly increase the compensation pressure from the first time point, and maintain the compensation pressure when a pressure obtained by summing the compensation pressure and the pressure of the flow path is equal to or greater than the pre-stored target pressure while the compensation pressure linearly increases, and the maintained compensation pressure may be a pressure at a second time point at which the summed pressure is equal to or greater than the pre-stored target pressure.

The processor may control the motor to reduce the compensation pressure in proportion to a reduction in the pre-stored target pressure from a third time point at which the pressurization of the brake pedal ends.

The brake system may further include a memory for storing information on different reference values for each target pressure.

The pre-stored target pressure information may include a plurality of pressure values corresponding to a plurality of pedal force signals.

In accordance with another aspect of the present disclosure, a vehicle includes a brake pedal, a brake system including a motor configured to provide a pressure of a pressurizing medium to a wheel cylinder, a pedal force detector configured to output a pedal force signal corresponding to pressurization of the brake pedal, a pressure detector configured to detect a pressure of a flow path connected between the wheel cylinder and the motor, and a processor configured to acquire pressure information of the flow path based on a pressure signal of the pressure detector when receiving the pedal force signal of the pedal force detector, acquire a difference value between the pressure of the flow path and a target pressure corresponding to the pedal force signal based on the pressure information of the flow path and pre-stored target pressure information, acquire compensation pressure information based on the pressure information of the flow path and the pre-stored target pressure information when the acquired difference value is greater than or equal to a reference value, and control the motor based on the acquired compensation pressure information.

The vehicle may further include a temperature detector. The processor may identify whether a current temperature is higher than or equal to a first temperature based on a temperature signal of the temperature detector when receiving the pedal force signal of the pedal force detector, acquire the pressure information of the flow path based on the pressure signal of the pressure detector when identifying that the current temperature is higher than or equal to the first temperature, and store the pressure information of the flow path as the target pressure information.

The processor may control the motor based on the pedal force signal of the pedal force detector when identifying that the current temperature is higher than or equal to the first temperature.

The vehicle may further include a temperature detector. The processor may identify whether a current temperature is lower than a second temperature based on a temperature signal of the temperature detector when receiving the pedal force signal of the pedal force detector, and control the motor based on the acquired compensation pressure information when identifying that the current temperature is lower than the second temperature.

The processor may control the motor based on the pedal force signal of the pedal force detector when identifying that the acquired difference value is smaller than the reference value.

The processor may control the motor to generate a compensation pressure from a first time point at which the acquired difference value is greater than or equal to the reference value, linearly increase the compensation pressure from the first time point, maintain the compensation pressure when a pressure obtained by summing the compensation pressure and the pressure of the flow path is equal to or greater than the pre-stored target pressure while the compensation pressure linearly increases, and reduce the compensation pressure in proportion to a reduction in the pre-stored target pressure from a third time point at which the pressurization of the brake pedal ends. The maintained compensation pressure may be a pressure at a second time point at which the summed pressure is equal to or greater than the pre-stored target pressure.

The vehicle may further include a memory for storing information on different reference values for each target pressure.

The pre-stored target pressure information may include a plurality of pressure values corresponding to a plurality of pedal force signals.

In accordance with still another aspect of the present disclosure, a method of controlling a brake system including a motor configured to provide a pressure of a pressurizing medium to a wheel cylinder of a vehicle includes acquiring pressure information of a flow path based on a pressure signal corresponding to a pressure of the flow path connected to the wheel cylinder of the vehicle when receiving a pedal force signal corresponding to pressurization of a brake pedal of the vehicle, acquiring a difference value between the pressure of the flow path and a target pressure corresponding to the pedal force signal based on the pressure information of the flow path and pre-stored target pressure information, acquiring compensation pressure information based on the pressure information of the flow path and the pre-stored target pressure information when the acquired difference value is greater than or equal to a reference value, and controlling the motor based on the acquired compensation pressure information.

The acquiring of the compensation pressure information may include generating a compensation pressure from a first time point at which the acquired difference value is greater than or equal to the reference value, linearly increasing the compensation pressure from the first time point, maintaining the compensation pressure when a pressure obtained by summing the compensation pressure and the pressure of the flow path becomes equal to the pre-stored target pressure while the compensation pressure linearly increases, and reducing the compensation pressure in proportion to a reduction in the pre-stored target pressure from a third time point at which the pressurization of the brake pedal ends. The maintained compensation pressure may be a pressure at a second time point at which the summed pressure is equal to or greater than the pre-stored target pressure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
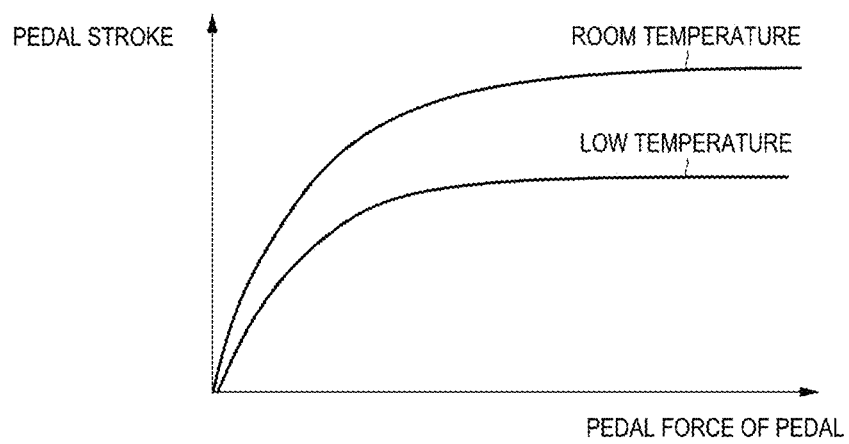
FIG. 1A is a graph of a stroke of a brake pedal corresponding to a force (i.e., a pedal force) applied to the brake pedal for each external temperature according to the related art.
Figure 1B:
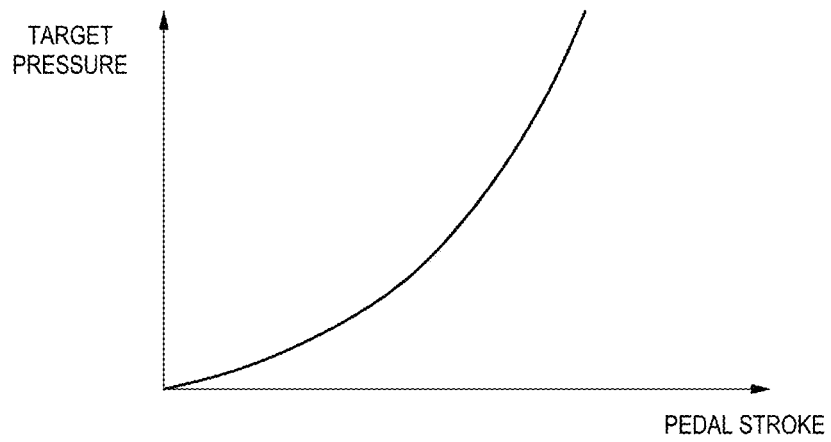
FIG. 1B is a graph of a target pressure of a wheel cylinder corresponding to the stroke of the brake pedal according to the related art.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the present disclosure will be described in detail with reference to the accompanying drawings.

Figure 2:
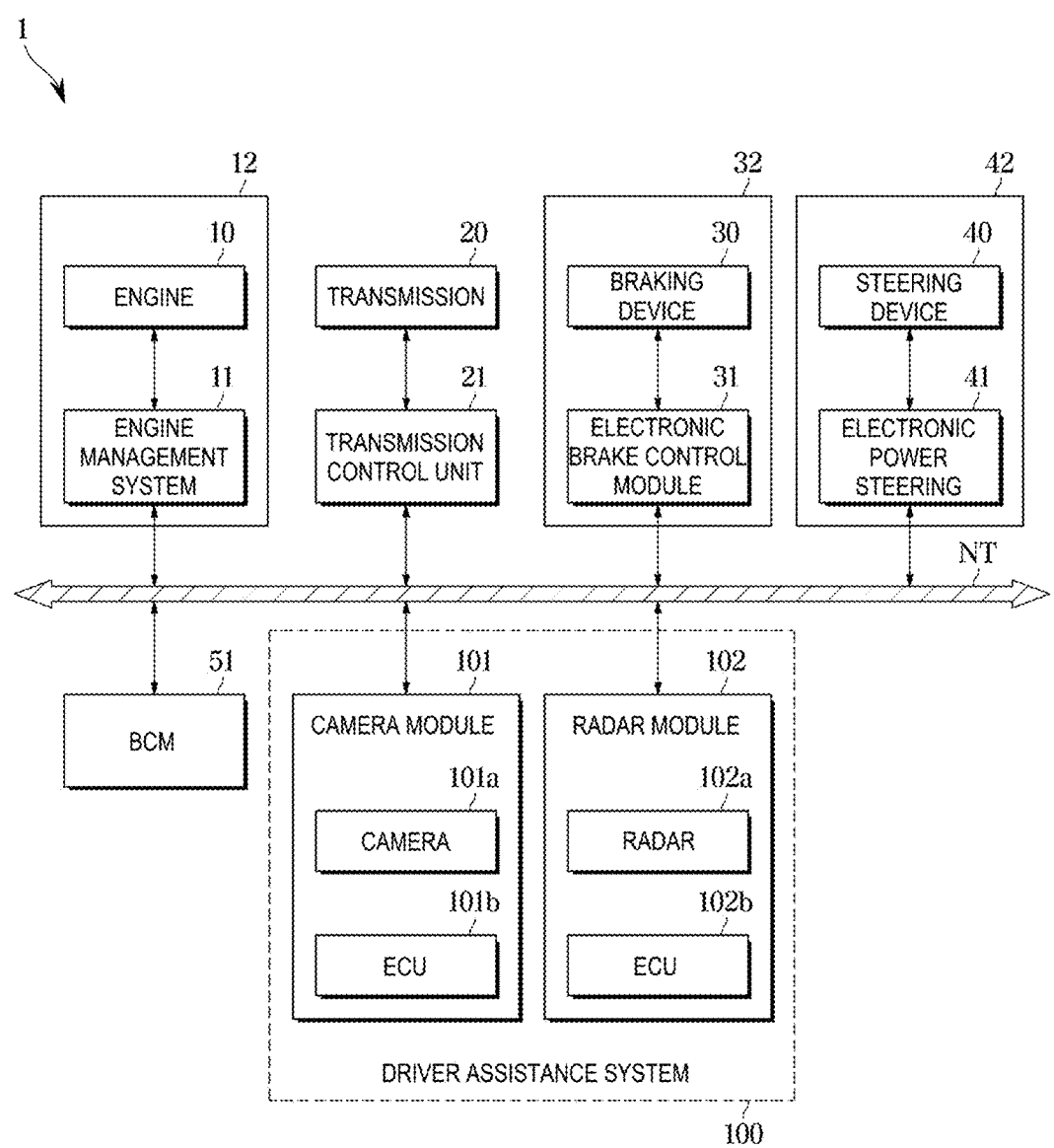
FIG. 2 is a configuration diagram of a vehicle according to an embodiment.

FIG. 2 is a configuration diagram of a vehicle according to an embodiment.

The vehicle according to the embodiment may be an internal combustion engine vehicle or an eco-friendly vehicle.

In the embodiment, an example of the internal combustion engine vehicle will be described.

As shown in FIG. 2, a vehicle 1 includes an engine 10, a transmission 20, a braking device 30, and a steering device 40.

The engine 10 may include a cylinder and a piston and generate power for the vehicle 1 to travel.

The transmission 20 may include a plurality of gears and transmit the power generated by the engine 10 to wheels.

The braking device 30 may decelerate the vehicle 1 or stop the vehicle 1 through friction with the wheels.

The steering device 40 may change a traveling direction of the vehicle 1.

The vehicle 1 may include a plurality of electronic components.

For example, the vehicle 1 further includes an engine management system (EMS) 11, a transmission control unit (TCU) 21, an electronic brake control module 31, an electronic power steering (EPS) 41, a body control module (BCM) 51, and a driver assistance system (DAS) 100.

The EMS 11 may control the engine 10 in response to a user's acceleration intention through an accelerator pedal or a request of the DAS 100. For example, the EMS 11 may control a torque of the engine 10.

The TCU 21 may control the transmission 20 in response to a user's transmission command through a transmission lever (also referred to as a gear lever, a shifting lever, or a gear shift) and/or a traveling speed of the vehicle 1. For example, the TCU 21 may adjust a transmission ratio from the engine 10 to the wheels.

The electronic brake control module 31 may control the braking device 30 in response to a user's braking intention through a brake pedal and/or slip of the wheels. For example, the electronic brake control module 31 may temporarily release the braking of the wheels in response to the slip of the wheels detected during braking of the vehicle 1 (anti-lock brake system (ABS)).

The electronic brake control module 31 may selectively release the braking of the wheels in response to oversteering and/or understeering detected during steering of the vehicle 1 (electronic stability control (ESC)).

In addition, the electronic brake control module 31 may temporarily brake the wheels in response to the slip of the wheels detected during driving of the vehicle 1 (traction control system (TCS)).

The EPS 41 may assist an operation of the steering device 40 so that the user may easily operate a steering wheel in response to a user's steering intention through the steering wheel. For example, the EPS 41 may assist the operation of the steering device 40 to reduce a steering force during low-speed traveling or parking and increase the steering force during high-speed traveling.

That is, the vehicle 1 may include a braking system 32, an engine system 12, and a steering system 42.

The engine system 12 may include the EMS 11 and the engine 10 described with reference to FIG. 2, the braking system 32 may include the electronic brake control module 31 (see FIG. 2) and the braking device 30 (see FIG. 2) described with reference to FIG. 2, and the steering system 42 may include the EPS 41 (see FIG. 2) and the steering device 40 (see FIG. 2).

The BCM 51 may control operations of electronic components for providing convenience to the user or ensuring the safety of the user. For example, the BCM 51 may control headlamps, wipers, clusters, multi-function switches, turn signal lamps, and the like.

The DAS 100 may assist the user operating (driving, braking, and steering) the vehicle 1. For example, the DAS 100 may detect nearby environments (e.g., other vehicles, pedestrians, cyclists, lane lines, and traffic signs) around the vehicle 1 and control the driving, braking, and/or steering of the vehicle 1 in response to the detected environments.

The DAS 100 may provide various functions to the user. For example, the DAS 100 may provide lane departure warning (LDW), lane keeping assist (LKA), high beam assist (HBA), autonomous emergency braking (AEB), traffic sign recognition (TSR), smart cruise control (SCC), blind spot detection (BSD), and the like.

The DAS 100 may allow the vehicle 1 itself to automatically travel to a destination by recognizing road environments, determining obstacles and traveling situations, and controlling the traveling of the vehicle according to a planned traveling path while avoiding the obstacles.

The DAS 100 includes a camera module 101 for acquiring image data around the vehicle 1 and a radar module 102 for acquiring obstacle data around the vehicle 1.

The camera module 101 may include a camera 101*a* and a controller (electronic control unit (ECU)) 101*b*, capture the surroundings of the vehicle 1 and recognize other vehicles, pedestrians, cyclists, lane lines, traffic signs, and the like.

The radar module 102 may include a radar 102*a* and a controller 102*b* and acquire relative positions, relative speeds, and the like of obstacles (e.g., other vehicles, pedestrians, cyclists, and the like) around the vehicle 1.

The above electronic components may communicate with each other via a vehicle communication network NT. For example, the electronic components may transmit and receive data via Ethernet, media oriented systems transport (MOST), Flexray, a controller area network (CAN), a local interconnect network (LIN), or the like.

The DAS 100 may transmit a driving control signal, a braking control signal, and a steering control signal to each of the EMS 11, the electronic brake control module 31, and the EPS 41 via the vehicle communication network NT.

Figure 3:
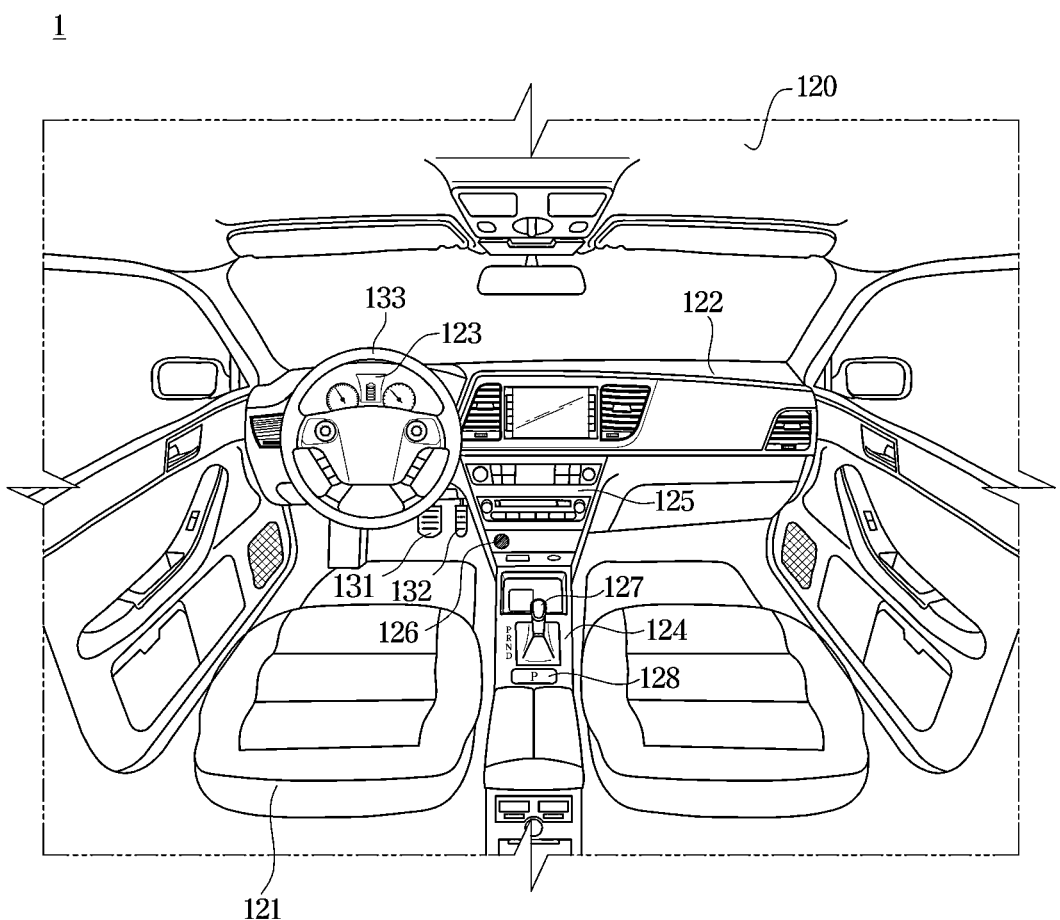
FIG. 3 is an exemplary view showing an interior of the vehicle according to the embodiment.

FIG. 3 is an exemplary view showing an interior of the vehicle according to the embodiment.

As shown in FIG. 3, an interior 120 of a vehicle body includes a seat 121 on which an occupant sits, a dashboard 122, a cluster 123 disposed on the dashboard and on which a tachometer, a speedometer, a coolant thermometer, a fuel gauge, a turn signal indicator lamp, a high beam indicator lamp, a warning lamp, a seat belt warning lamp, a trochometer, an odometer, a transmission lever indicator lamp, an door open warning lamp, an engine oil warning lamp, and a fuel shortage warning lamp are disposed, a center fascia 124 on which a vent and a control panel of an air conditioner are disposed, a head unit 125 provided on the center fascia 124 to receive operation commands of an audio device and the air conditioner, and a start button 126 provided on the center fascia 124 to receive a start command.

The head unit 125 may be provided with an input unit for receiving operation commands for various functions and a display for displaying information on functions being performed in the vehicle and information input by a user.

The vehicle 1 further includes a transmission lever 127 provided on the center fascia 124 to receive an operation position, and an electric park brake (EPB) button 128 positioned around the transmission lever or on the head unit 125 to receive the operation command of an electronic parking brake device.

The vehicle 1 includes a brake pedal 131 pressed by the user according to the user's braking intention, an accelerator pedal 132 pressed by the user according to the user's acceleration intention, and a steering wheel 133 of the steering device for adjusting the traveling direction.

A chassis of a vehicle is a frame for supporting a vehicle body and includes a plurality of wheels FR, FL, RR, and RL respectively disposed on front/rear and left/right sides of the vehicle. That is, the wheels include front left and right wheels FL and FR and rear left and right wheels RL and RR.

Figure 4:
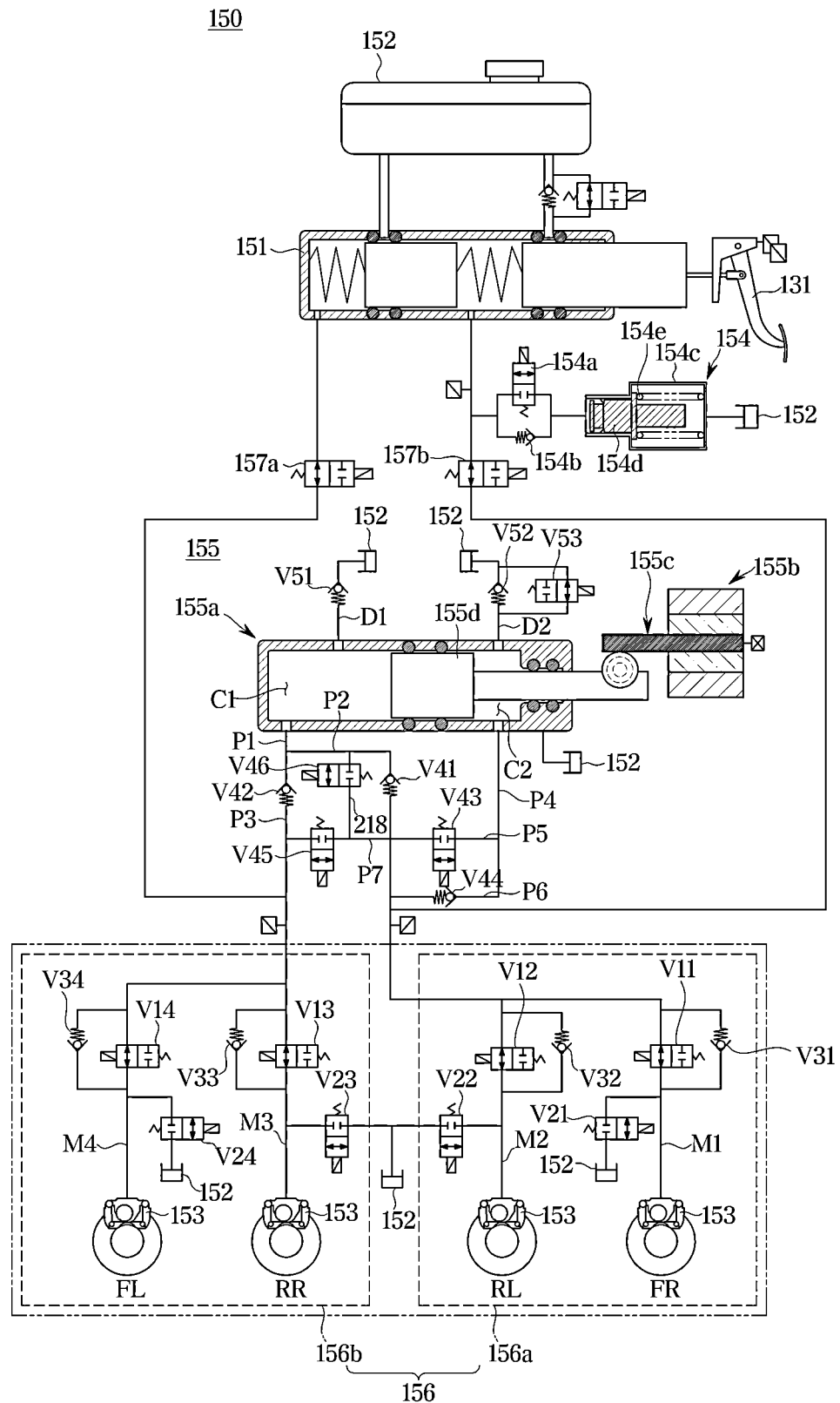
FIG. 4 is a configuration diagram of a brake system of the vehicle according to the embodiment.

FIG. 4 is a configuration diagram of a brake system of the vehicle according to the embodiment.

The brake system is a device used to decelerate or stop the vehicle while driving and also maintains a parking state and generates a braking force using a frictional force.

Briefly describing a principle of the brake system, when the user steps on the brake pedal 131, a pressure is applied to the brake system and converted into a hydraulic pressure force, and the hydraulic pressure force is transmitted to a wheel cylinder through a brake line and then a mechanical pressure is converted to the braking force in the wheel cylinder.

A brake system 150 in the embodiment may be an integrated dynamic brake (IDB) system.

As shown in FIG. 4, the IDB system is a brake system for directly driving a pressure piston using a motor 155*b* to generate a braking pressure and may replace a vacuum booster and perform a function of a vehicle attitude stability control (ESC).

As shown in FIG. 4, the brake system 150 includes a master cylinder 151 pressurized by a pedal force of the brake pedal 131 to generate a hydraulic pressure, a reservoir 152 coupled to an upper portion of the master cylinder 151 to store oil, wheel cylinders 153 for receiving the hydraulic pressure to perform braking of each wheel RR, RL, FR, and FL, and a simulation device 154 for providing a reaction force according to the pedal force of the brake pedal 131.

Meanwhile, several reservoirs 152 are shown in the drawing, and each reservoir 152 uses the same reference numeral. However, these reservoirs may be provided as the same part or different parts.

For example, the reservoir 152 connected to the simulation device 154 may be the same as the reservoir 152 connected to the master cylinder 151 or may be a storage capable of storing the oil separately from the reservoir 152 connected to the master cylinder 151.

In addition, a simulator check valve 154*b* may be installed between the simulation device 154 and the reservoir 152 to be connected to a simulator valve 154*a* in parallel.

The simulator check valve 154*b* may allow the oil in the reservoir 152 to flow into a simulation chamber 154*c* and block the oil in the simulation chamber 154*c* to flow into the reservoir 152 through a flow path on which the check valve 154*b* is installed.

Describing an operation state of the simulation device 154, when the user provides a pedal force to the brake pedal 131, a reaction force piston 154*d* of the pedal simulator compresses a reaction force spring 154*e* to push the oil in the simulation chamber 154*c*, the oil is transmitted to the reservoir 152 through the simulator valve 154*a*, and in this process, the user receives a brake pedal feeling.

In addition, when the user releases the pedal force from the brake pedal 131, the reaction force spring 154*e* pushes the reaction force piston 154*d* to return the reaction force piston 154*d* to an original state, and as the oil in the reservoir 152 flows into the simulation chamber 154*c* through a flow path on which the simulator valve 154*a* is installed and a flow path on which the check valve 154b is installed, an inside of the simulation chamber 154c may be filled with the oil.

As described above, since the inside of the simulation chamber 154c is always filled with the oil, it is possible to minimize the friction of the reaction force piston 154d when the simulation device 154 operates, thereby not only increasing the durability of the simulation device 154 but also blocking the introduction of external foreign substances.

The brake system 150 may include a hydraulic pressure supply device 155 mechanically operated by receiving an electrical signal of the user's braking intention according to the pressing of the brake pedal 131, a hydraulic pressure adjustment device 156 composed of first and second hydraulic pressure circuits 156a and 156b for adjusting a flow of the hydraulic pressure transmitted to the wheel cylinders 153 respectively provided on two wheels FL and RR, and FR and RL, a first cut valve 157a provided between the master cylinder 151 and the first hydraulic pressure circuit 156a to control the flow of the hydraulic pressure, a second cut valve 157b provided between the master cylinder 151 and the second hydraulic pressure circuit 156b to control the flow of the hydraulic pressure, and an electronic control unit 170 for controlling the hydraulic pressure supply device 155 and a plurality of valves 154a (V11 to V14, V21 to V24, V31 to V34, V41 to V46, and V51 to V53) based on hydraulic pressure information and pedal displacement information.

The hydraulic pressure supply device 155 may include a hydraulic pressure part 155a for providing an oil pressure transmitted to the wheel cylinder 153, the motor 155b for generating a rotating force by the electrical signal according to the pressing of the brake pedal, and a power converter 155c for converting a rotating motion into a linear motion and transmitting the linear motion to the hydraulic pressure part 155a.

The hydraulic pressure part 155a of the brake system may operate in a double-action manner.

That is, as the hydraulic piston 155d moves forward, a hydraulic pressure generated in a first pressure chamber C1 may be transmitted to the first hydraulic pressure circuit 156a to operate the wheel cylinders 153 installed on the front right wheel FR and the rear left wheel RL and transmitted to the second hydraulic pressure circuit 156b to operate the wheel cylinders 153 installed on the rear right wheel RR and the front left wheel FL.

Likewise, as the hydraulic piston 155d moves backward, a hydraulic pressure generated in a second pressure chamber C2 may be transmitted to the first hydraulic pressure circuit 156a to operate the wheel cylinders 153 installed on the front right wheel FR and the rear left wheel RL and transmitted to the second hydraulic pressure circuit 156b to operate the wheel cylinders 153 installed on the rear right wheel RR and the front left wheel FL.

In addition, as the hydraulic piston 155d moves backward, a negative pressure generated in the first pressure chamber C1 may suction the oil in the wheel cylinders 153 installed on the front right wheel FR and the rear left wheel RL and transmit the oil to the first pressure chamber C1 through the first hydraulic pressure circuit 156a, and suction the oil in the wheel cylinders 153 installed on the rear right wheel RR and front left wheel FL and transmit the oil to the first pressure chamber C1 through the second hydraulic pressure circuit 156b.

Next, the motor 155b and the power converter 155c of the hydraulic pressure supply device 155 will be described.

The motor 155b is a device for generating a rotating force by a signal output from the electronic control unit 170 and may generate the rotating force in a forward direction or a reverse direction. A rotation angular velocity and a rotation angle of the motor 155b may be precisely controlled. Since the motor 155b is a well-known technology, a detailed description thereof will be omitted.

Meanwhile, the electronic control unit 170 controls the motor 155b and the plurality of valves.

An operation of the plurality of valves controlled according to the displacement of the brake pedal 131 will be described below.

A driving force of the motor 155b causes the displacement of the hydraulic piston 155d through the power converter 155c, and the hydraulic pressure generated as the hydraulic piston 155d slides in the pressure chamber is transmitted to the wheel cylinders 153 installed on each wheel RR, RL, FR and FL through first and second hydraulic pressure flow paths P1 and P2.

The power converter 155c is a device for converting the rotating motion into the linear motion.

The power converter 155c is connected to the hydraulic piston 155d to slide the hydraulic piston 155d inside the housing.

That is, the brake system drives the motor 155b in one direction according to the pressure applied as the displacement of the brake pedal 131 occurs and at this time, as the hydraulic piston 155d moves forward, the hydraulic pressure is generated in the first pressure chamber C1.

Conversely, when the pedal force is removed from the brake pedal 131, the motor 155b is driven in an opposite direction, and at this time, as the hydraulic piston 155d returns (moves backward), the negative pressure is generated in the first pressure chamber C1.

Meanwhile, the generation of the hydraulic pressure and the negative pressure is also possible in the reverse manner direction.

That is, the motor 155b is driven in the opposite direction according to the pressure applied as the displacement of the brake pedal 131 occurs, and at this time, as the hydraulic piston 155d moves backward, a hydraulic pressure is generated in the second pressure chamber C2.

Conversely, when the pedal force is removed from the brake pedal 131, the motor 155b is driven in the one direction, and at this time, as the hydraulic piston 155d returns (moves forward), a negative pressure is generated in the second pressure chamber C2.

As described above, the hydraulic pressure supply device 155 serves to transmit the hydraulic pressure to the wheel cylinder 153 or suction and transmit the hydraulic pressure to the reservoir 152 according to a rotating direction of the rotating force generated from the motor 155b.

Meanwhile, when the motor 155b rotates in one direction, the hydraulic pressure may be generated in the first pressure chamber C1 or the negative pressure may be generated in the second pressure chamber C2, and whether the braking is performed using the hydraulic pressure or the braking is released using the negative pressure may be determined by controlling the valves.

The brake system may further include first and second backup flow paths through which the oil discharged from the master cylinder 151 may be directly supplied to the wheel cylinders 153 during an abnormal operation (fallback mode).

The hydraulic pressure adjustment device 156 may be composed of the first hydraulic pressure circuit 156a and the second hydraulic pressure circuit 156b, each of which receives the hydraulic pressure and controls two wheels. For example, the first hydraulic pressure circuit 156a may control the front right wheel FR and the rear left wheel RL, and the second hydraulic pressure circuit 156b may control the front left wheel FL and the rear right wheel RR. In addition, the wheel cylinder 153 is installed on each of the wheels FR, FL, RR, and RL to receive the hydraulic pressure and perform braking.

The first hydraulic pressure circuit 156a is connected to the first hydraulic pressure flow path P1 and the second hydraulic pressure flow path P2 to receive the hydraulic pressure from the hydraulic pressure supply device 155, and the second hydraulic pressure flow path P2 is branched off to two flow paths connected to the front right wheel FR and the rear left wheel RL.

Likewise, the second hydraulic pressure circuit 156b is connected to the first hydraulic pressure flow path P1 and a third hydraulic pressure flow path P3 to receive the hydraulic pressure from the hydraulic pressure supply device 155, and the third hydraulic pressure flow path P3 is branched off to two flow paths connected to the front left wheel FL and the rear right wheel RR.

The hydraulic pressure circuits 156a and 156b may include a plurality of inlet valves V11 to V14 to control the flow of the hydraulic pressure.

For example, the first hydraulic pressure circuit 156a may be provided with two inlet valves V11 and V12 connected to the first hydraulic pressure flow path P1 to respectively control the hydraulic pressures transmitted to the two wheel cylinders 153.

In addition, the second hydraulic pressure circuit 156b may be provided with two inlet valves V13 and V14 connected to the second hydraulic pressure flow path P2 to control the hydraulic pressures transmitted to the wheel cylinders 153.

In addition, the inlet valves V11 to V14 are disposed upstream of the wheel cylinder 153 and may be provided as a normal open type solenoid valve that is normally open and then operates so that the valve is closed when receiving a closing signal.

In addition, the hydraulic pressure circuits 156a and 156b may include check valves V31 to V34 provided on a bypass flow path for connecting front and rear sides of each inlet valve V11 to V14. The check valves V31 to V34 may be provided to allow only the flow of the oil in a direction from the wheel cylinder 153 toward the hydraulic pressure part 155a and restrict the flow of the oil in a direction from the hydraulic pressure part 155a toward the wheel cylinder 153.

The check valves V31 to V34 may allow the braking pressure of the wheel cylinder 153 to be quickly discharged and allow the hydraulic pressure of the wheel cylinder 153 to flow into the hydraulic pressure part 155a when the inlet valves V11 to V14 do not normally operate.

In addition, the hydraulic pressure circuits 156a and 156b may further include a plurality of outlet valves V21 to V24 connected to the reservoir 152 in order to improve performance when the braking is released. The outlet valves V21 to V24 are respectively connected to the wheel cylinders 153 to control the hydraulic pressures from being discharged from the wheels RR, RL, FR, and FL. That is, the outlet valves V21 to V24 may detect the braking pressures of each wheel RR, RL, FR, and FL and may be selectively opened, when a reducing-pressure braking is required, to control the pressure.

In addition, the outlet valves V21 to V24 may be provided as a normal closed type solenoid valve that is normally closed and then operates so that the valve is opened when receiving an opening signal.

In addition, the hydraulic pressure adjustment device 156 may be connected to the backup flow path. For example, the first hydraulic pressure circuit 156a may be connected to the first backup flow path to receive the hydraulic pressure from the master cylinder 151, and the second hydraulic pressure circuit 156b may be connected to the second backup flow path to receive the hydraulic pressure from the master cylinder 151.

The hydraulic pressure supply device 155 may be used by being classified into a low-pressure mode and a high-pressure mode. The low-pressure mode and the high-pressure mode may be switched by differently operating the hydraulic pressure adjustment device 156. The hydraulic pressure supply device 155 may generate a high hydraulic pressure even without increasing the output of the motor 155b using the high-pressure mode. Therefore, it is possible to secure a stable braking force while reducing a price and a weight of the brake system.

More specifically, the hydraulic piston 155d generates the hydraulic pressure in the first pressure chamber C1 while moving forward. As the hydraulic piston 155d moves forward in an initial state, that is, as a stroke of the hydraulic piston 155d increases, the braking pressure increases as an amount of oil transmitted from the first pressure chamber C1 to the wheel cylinder 153 increases. However, since there is an effective stroke of the hydraulic piston 155d, there is a maximum pressure caused by the forward movement of the hydraulic piston 155d.

In this case, the maximum pressure in the low-pressure mode is smaller than the maximum pressure in the high-pressure mode. However, in the high-pressure mode, a pressure increase rate per stroke of the hydraulic piston 155d is smaller than that of the low pressure mode. This is because not all of the oil pushed from the first pressure chamber C1 flows into the wheel cylinder 153 but some flows into the second pressure chamber C2.

Therefore, the low-pressure mode having a larger pressure increase rate per stroke may be used at an initial stage of braking that braking responsiveness is important, and the high-pressure mode having a larger maximum pressure may be used at a late stage of braking that the maximum braking force is important.

When braking by the user starts, a demand braking amount of the user may be detected through information, such as the pressure of the brake pedal 131 stepped on by the user. The electronic control unit 170 drives the motor 155b according to the pressure of the pedal.

In addition, the electronic control unit 170 may receive a magnitude of a regenerative braking amount through a backup flow path pressure sensor (not shown) provided at an outlet side of the master cylinder 151 and a hydraulic pressure flow path pressure sensor (not shown) provided on the second hydraulic pressure circuit 156b and calculate a magnitude of a friction braking amount according to a difference between the demand braking amount of the user and the regenerative braking amount to identify a magnitude of an increasing-pressure or a reducing-pressure of the wheel cylinder 153.

In addition, the brake system may also selectively brake the plurality of wheels like the ABS operation. For example, the hydraulic piston 155d may selectively perform the braking while moving forward, and as another example, the hydraulic piston 155d may also selectively perform the braking while moving backward.

First, the fact that the hydraulic piston 155d selectively performs braking while moving forward is that when the motor 155b operates according to the pedal force of the brake pedal 131, the rotating force of the motor 155b is transmitted to the hydraulic pressure part 155a through the power converter 155c to generate the hydraulic pressure. At this time, the first and second cut valves 157a and 157b are closed so that the hydraulic pressure discharged from the master cylinder 151 is not transmitted to the wheel cylinders 153.

As the hydraulic piston 155d moves forward, the hydraulic pressure is generated in the first pressure chamber C1, and the fourth inlet valve V14 is provided in an open state so that the hydraulic pressure transmitted through the first hydraulic pressure flow path P1 and the third hydraulic pressure flow path P3 operates the wheel cylinder 153 positioned on the front left wheel FL to generate a braking force.

At this time, the first to third inlet valves V11 to V13 are switched to closed states, and the first to fourth outlet valves V21 to V24 maintain the closed states. In addition, a third dump valve V53 is provided in an open state to fill the second pressure chamber C2 with the oil from the reservoir 152.

As another example, the fact that selectively performing the braking while the hydraulic piston 155d moves backward is that as the hydraulic piston 155d moves backward, the hydraulic pressure is generated in the second pressure chamber C2, and the first inlet valve V11 is provided in an open state so that the hydraulic pressure transmitted through a fourth hydraulic pressure flow path P4 and the second hydraulic pressure flow path P2 operates the wheel cylinder 153 positioned on the front right wheel FR to generate a braking force.

At this time, the second to fourth inlet valves V22 to V24 are switched to closed states, and the first to fourth outlet valves V21 to V24 maintain the closed states.

The brake system 150 may independently control the operation of the motor 155b and each valve to selectively transmit or discharge the hydraulic pressure to and from the wheel cylinders 153 of each wheel RL, RR, FL, and FR according to a required target pressure, thereby enabling precise pressure control.

Next, flow paths P1 to P7 and the valves V41 to 46 and V51 to 53 connected to the first pressure chamber C1 and the second pressure chamber C2 will be described.

The second hydraulic pressure flow path P2 may communicate with the first hydraulic pressure circuit 156a, and the third hydraulic pressure flow path P3 may communicate with the second hydraulic pressure circuit 156b. Therefore, the hydraulic pressure may be transmitted to the first hydraulic pressure circuit 156a and the second hydraulic pressure circuit 156b by the forward movement of the hydraulic piston 155d.

In addition, the brake system according to one embodiment may include the first control valve V41 and the second control valve V42 respectively provided on the second and third hydraulic pressure flow paths P2 and P3 to control the flow of the oil.

In addition, the first and second control valves V41 and V42 may be provided as check valves for allowing only the flow of the oil in a direction from the first pressure chamber C1 to the first or second hydraulic pressure circuits 156a or 156b and block the flow of the oil in an opposite direction. That is, the first or second control valve V41 or V42 may allow the hydraulic pressure in the first pressure chamber C1 to be transmitted to the first or second hydraulic pressure circuit 156a or 156b and prevent the hydraulic pressure of the circuits 156a or 156b from leaking to the first pressure chamber C1 through the second or third hydraulic pressure flow path P2 or P3.

Meanwhile, the fourth hydraulic pressure flow path P4 may be branched off into the fifth hydraulic pressure flow path P5 and the sixth hydraulic pressure flow path P6 on the way and may communicate with both the first hydraulic pressure circuit 156a and the second hydraulic pressure circuit 156b.

For example, the fifth hydraulic pressure flow path P5 branched off from the fourth hydraulic pressure flow path P4 may communicate with the first hydraulic pressure circuit 156a, and the sixth hydraulic pressure flow path P6 branched off from the fourth hydraulic pressure flow path P4 may communicate with the second hydraulic pressure circuit 156b. Therefore, the hydraulic pressure may be transmitted to both the first hydraulic pressure circuit 156a and the second hydraulic pressure circuit 156b by the backward movement of the hydraulic piston 155d.

In addition, the brake system may include the third control valve V43 provided on the fifth hydraulic pressure flow path P5 to control the flow of the oil and the fourth control valve V44 provided on the sixth hydraulic pressure flow path P6 to control the flow of the oil.

The third control valve V43 may be provided as a two-way control valve for controlling the flow of the oil between the second pressure chamber C2 and the first hydraulic pressure circuit 156a. In addition, the third control valve V43 may be provided as a normally closed type solenoid valve that is normally closed and then operates so that the valve is opened when receiving an opening signal from the electronic control unit 170.

The fourth control valve V44 may be provided as a check valve for allowing only the flow of the oil in a direction from the second pressure chamber C2 to the second hydraulic pressure circuit 156b and blocking the flow of the oil in the opposite direction. That is, the fourth control valve V44 can prevent the hydraulic pressure of the second hydraulic pressure circuit 156b from leaking to the second pressure chamber C2 through the sixth hydraulic pressure flow path P6 and the fourth hydraulic pressure flow path P4.

In addition, the brake system may include the fifth control valve V45 provided on the seventh hydraulic pressure flow path P7 for connecting the second hydraulic pressure flow path P2 and the third hydraulic pressure flow path P3 to control the flow of the oil and the sixth control valve V46 provided on the eighth hydraulic pressure flow path P8 for connecting the second hydraulic pressure flow path P2 and the seventh hydraulic pressure flow path P7 to control the flow of the oil.

In addition, the fifth control valve V45 and the sixth control valve V46 may be provided as a normal closed type solenoid valve that is normally closed and then operates so that the valve is opened when receiving an opening signal from the electronic control unit 170.

The fifth control valve V45 and the sixth control valve V46 operate to be opened when the first control valve V41 or the second control valve V42 is abnormal so that the hydraulic pressure of the first pressure chamber C1 may be transmitted to both the first hydraulic pressure circuit 156a and the second hydraulic pressure circuit 156b.

In addition, the fifth control valve V45 and the sixth control valve V46 may operate to be opened when the hydraulic pressure of the wheel cylinder 153 is discharged and sent to the first pressure chamber C1. This is because the first control valve V41 and the second control valve V42 provided on the second hydraulic pressure flow path P2 and the third hydraulic pressure flow path P3 are provided as check valves for allowing only the flow of the oil in one direction.

In addition, the brake system may further include the first dump valve V51 and the second dump valve V52 respectively provided on first and second dump flow paths D1 and D2 to control the flow of the oil. The dump valves V51 and V52 may be check valves for opening the flow of the oil only in a direction from the reservoir 152 to the first or second pressure chambers C1 and C2 and closing the flow of the oil in an opposite direction.

That is, the first dump valve V51 may be a check valve for allowing the flow of the oil from the reservoir 152 to the first pressure chamber C1 and blocking the flow of the oil from the first pressure chamber C1 to the reservoir 152, and the second dump valve V52 may be a check valve for allowing the flow of the oil from the reservoir 152 to the second pressure chamber C2 and blocking the flow of the oil from the second pressure chamber C2 to the reservoir 152.

In addition, the second dump flow path D2 may include a bypass flow path, and the third dump valve V53 for controlling the flow of the oil between the second pressure chamber C2 and the reservoir 152 may be installed on the bypass flow path.

The third dump valve V53 may be provided as a solenoid valve capable of controlling a bidirectional flow and provided as a normal open type solenoid valve that is normally open and then operates so that the valve is closed when receiving a closing signal from the electronic control unit.

Figure 5:
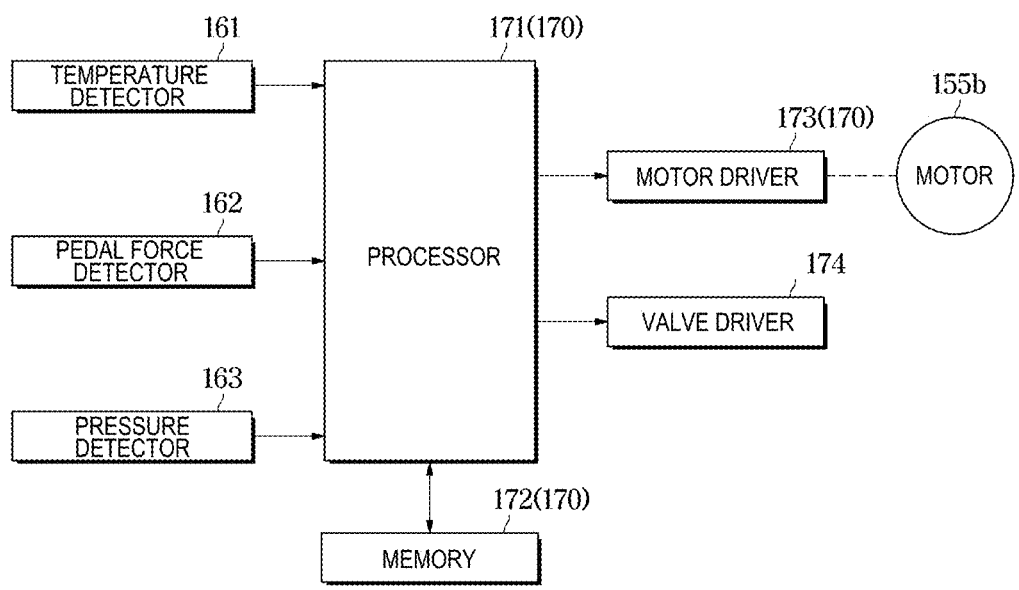
FIG. 5 is a control diagram of the brake system provided in the vehicle according to the embodiment.

FIG. 5 is a control diagram of the brake system provided in the vehicle according to the embodiment.

The brake system 150 of the vehicle 1 includes a temperature detector 161, a pedal force detector 162, a pressure detector 163, the electronic control unit 170, a motor driver 173, and a valve driver 174.

The electronic control unit 170 may include a processor 171 and a memory 172.

In addition, the electronic control unit 170 may further include the motor driver 173. In addition, the electronic control unit 170 may include the motor driver 173 and the valve driver 174.

The temperature detector 161 detects an external temperature.

The temperature detector 161 may also detect a temperature around the brake system.

The temperature detector 161 may transmit a temperature signal for the detected temperature to the processor 171.

The pedal force detector 162 may detect the pedal force applied to the brake pedal 131 and transmit a pedal force signal for the detected pedal force to the processor 171.

The pedal force detector 162 may include a force sensor for detecting a force corresponding to the pressing of the brake pedal 131.

The pedal force detector 162 may include a load cell for detecting a load corresponding to the pressurization of the brake pedal 131.

The pedal force detector 162 may include an angle sensor for detecting a rotating angle of the brake pedal 131 with respect to a rotating axis corresponding to the pressurization of the brake pedal 131.

The pedal force detector 162 may include a displacement sensor for detecting a change in a position of the brake pedal 131 corresponding to the pressurization of the brake pedal 131.

The pedal force detector 162 may include a pedal stroke sensor for detecting a stroke corresponding to the pressurization of the brake pedal 131.

The pressure detector 163 may detect the pressure of the flow path connected to the wheel cylinder and transmit a pressure signal corresponding to the detected pressure to the processor 171.

The flow path connected to the wheel cylinder may be a backup flow path provided at the outlet side of the master cylinder 151 or a flow path provided on the hydraulic pressure adjustment device 156.

The flow path connected to the wheel cylinder may be at least one of first, second, third, and fourth branch flow path M1, M2, M3, and M4 branched off from the first hydraulic pressure flow path P1 for connecting the hydraulic pressure supply device 155 to the wheel cylinder 153.

The pressure detector 163 may include one or two more pressure sensors provided on one or two more of the first, second, third, and fourth branch flow paths M1, M2, M3, and M4.

Positions and the number of pressure sensors are not limited. For example, the pressure sensor may be provided at positions at which the hydraulic pressure generated by the master cylinder and/or the hydraulic pressure supply device 155 may be detected.

The pressure detector 163 may be provided on the hydraulic pressure adjustment device 156 for providing the hydraulic pressure to the wheel cylinders 47a and 47b to detect a hydraulic pressure of a pressurizing medium in the hydraulic pressure adjustment device 156.

That is, the pressure detector 163 may measure the hydraulic pressure of the hydraulic pressure adjustment device 156.

The pressure detector 163 may transmit an electrical output signal (pressure signal) depending on the detected hydraulic pressure to the processor 171.

When receiving the temperature signal of the temperature detector 161, the processor 171 acquires temperature information around the brake system 150 based on the received temperature signal.

The processor 171 may identify whether the temperature around the brake system 150 is higher than or equal to a first temperature and lower than a second temperature based on the acquired temperature information.

The first temperature may be room temperature, and the second temperature may be a low temperature lower than the first temperature.

The processor 171 may acquire pedal force information of the brake pedal 131 based on the pedal force signal received by the pedal force detector 162 and acquire stroke information corresponding to the acquired pedal force information.

When the force sensor is provided as the pedal force detector 162, the processor 171 may acquire the pedal force information based on a signal of the force sensor.

When the load cell is provided as the pedal force detector 162, the processor 171 may acquire the pedal force information based on a signal of the load cell.

When the angle sensor is provided as the pedal force detector 162, the processor 171 may acquire the pedal force information based on a signal of the angle sensor.

When the displacement sensor is provided as the pedal force detector 162, the processor 171 may acquire the pedal force information based on a signal of the displacement sensor.

When the stroke sensor is provided as the pedal force detector 162, the processor 171 may directly acquire the stroke information based on a signal of the stroke sensor.

The processor 171 may acquire the pressure information of the wheel cylinder based on the pressure signal received by the pressure detector 163.

The processor 171 may check the hydraulic pressure generated in the first pressure chamber C1 and also predict the pressure information of the wheel cylinder using the checked hydraulic pressure and a volume-pressure graph.

When receiving the pedal force signal from the pedal force detector 162, the processor 171 determines that the user intends to brake and controls braking. Here, the braking intention may include deceleration intention.

The processor 171 may output a control signal for braking the vehicle 1 in response to the user's braking intention. For example, the processor 171 may output control signals for controlling the motor 155b and the valves based on the signal from the pedal force detector 162 according to a program and data provided from the memory 172.

More specifically, when receiving the pedal force signal from the pedal force detector 162, the processor 171 checks the pedal force information corresponding to the received pedal force signal based on the information stored in the memory 172, acquires the stroke information based on the information stored in the memory 172 and the checked pedal force information, acquires target torque information of the motor 155b based on the acquired stroke information, controls the driving of the motor 155b based on the acquired target torque information of the motor 155b, and controls the plurality of valves provided in the hydraulic pressure adjustment device 156.

At this time, the hydraulic pressure generated in the first pressure chamber C1 as the hydraulic piston 155d moves forward by the driving of the motor 155b may be transmitted to the first hydraulic pressure circuit 156a to operate the wheel cylinders 153 installed on the front right wheel FR and the rear left wheel RL and transmitted to the second hydraulic pressure circuit 156b to operate the wheel cylinders 153 installed on the rear right wheel RR and the front left wheel FL.

The processor 171 may check a target current corresponding to the control signal of the motor 155b and an applied current applied to the motor 155b detected through a current detector (not shown) and adjust a torque generated by the motor 155b based on the checked target current and the applied current so that the torque generated by the motor is adjusted to a target torque.

Figure 6:
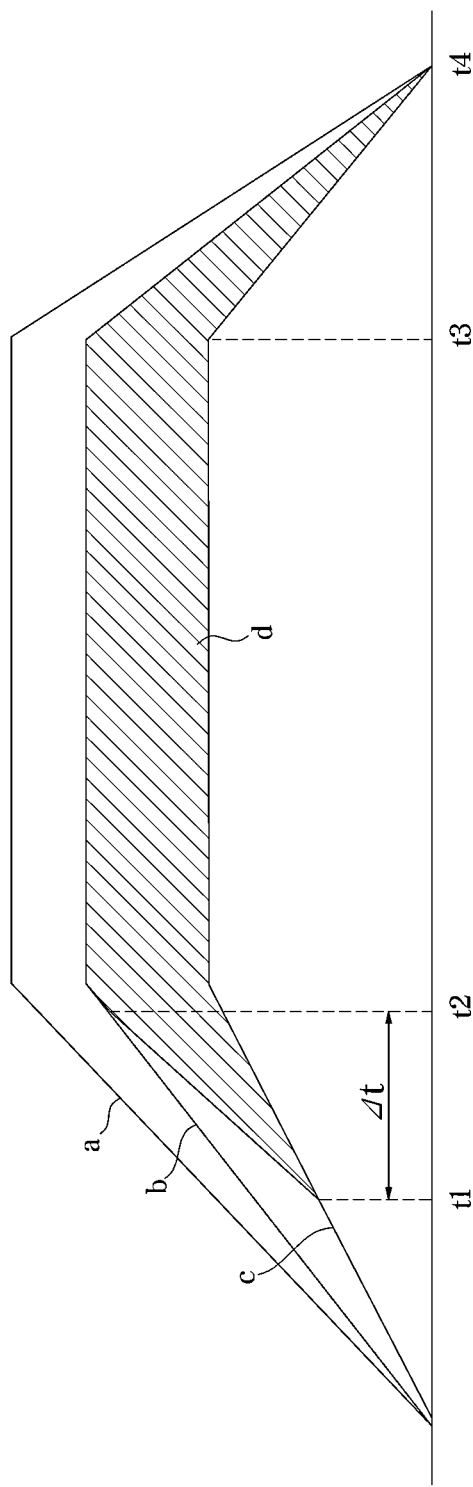
FIG. 6 is a graph for describing pressure compensation of a wheel cylinder in the brake system of the vehicle according to the embodiment.

As shown in FIG. 6, the processor 171 may acquire and store the pedal force information from a pressurization start time point of the brake pedal 131 to a pressurization end time point of the brake pedal 131 (graph a in FIG. 6).

The processor 171 acquires first pressure information of the wheel cylinder based on the pressure signal detected by the pressure detector 163 while braking is performed, determines whether a current temperature is higher than or equal to the first temperature based on the temperature signal of the temperature detector 163, and stores the acquired first pressure information as first target pressure information when it is determined that the current temperature is higher than or equal to the first temperature (graph b in FIG. 6). The first target pressure information may include a plurality of pressure values corresponding to a plurality of pedal force signals.

The processor 171 may acquire and store the first target pressure information from the pressurization start time point of the brake pedal 131 to the pressurization end time point of the brake pedal 131.

Considering that the pressure of the wheel cylinder corresponding to the pedal force may vary depending on the type of vehicle, it is preferable to acquire the first target pressure information at the first temperature or higher for each vehicle.

The first target pressure information as information acquired through tests may be information stored when the vehicle is manufactured or may also be information stored by being provided from a server (not shown) after the vehicle is manufactured.

The first target pressure information at the first temperature or higher may be information acquired and learned while the vehicle travels.

The processor 171 controls the operations of the motor 155b and the valves when receiving the pedal force signal from the pedal force detector 162 while traveling, acquires second pressure information of the wheel cylinder based on the pressure signal detected by the pressure detector 163, and acquires the acquired second pressure information as second target pressure information. (graph c in FIG. 6) The second target pressure information may include a plurality of pressure values corresponding to the plurality of pedal force signals.

The processor 171 acquires compensation pressure information in which the second target pressure follows the first target pressure based on the first target pressure information and the second target pressure information. (graph d in FIG. 6)

The processor 171 may determine whether a difference value between the first target pressure and the second target pressure is greater than or equal to a reference value based on the first target pressure information and the second target pressure information and control the motor 155b so that the compensation pressure is generated when the difference value is greater than or equal to the reference value.

Therefore, pressure compensation for the second target pressure may be performed.

The processor 171 may perform the pressure compensation from a first time point t1 at which the difference value between the first target pressure and the second target pressure is greater than or equal to the reference value.

Figure 7:
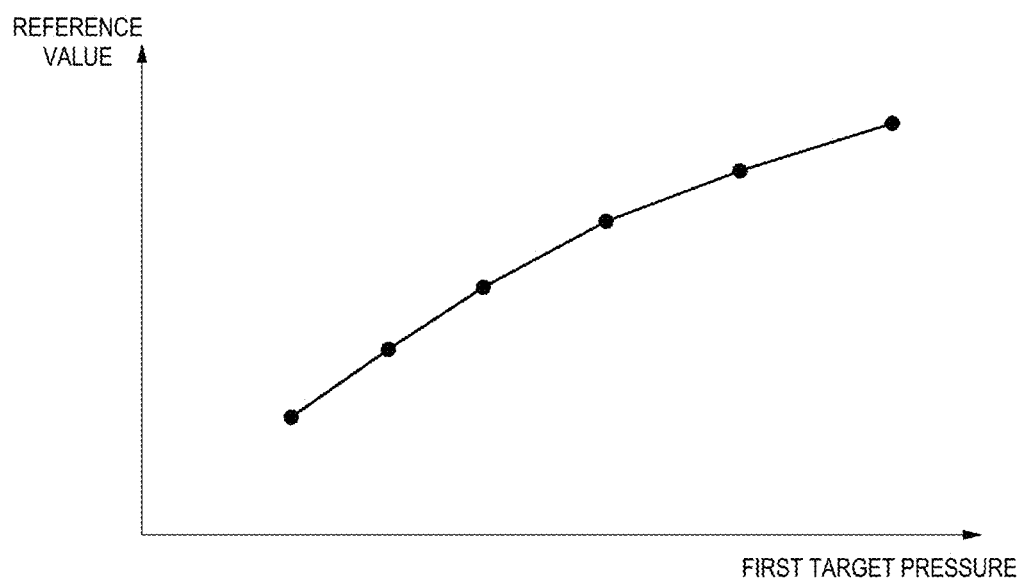
FIG. 7 is a graph showing a reference value corresponding to a first target pressure of the brake system of the vehicle according to the embodiment.

As shown in FIG. 7, the reference value may be different according to the first target pressure.

The processor 171 linearly increases the compensation pressure from the first time point t1, sums the linearly increased compensation pressure and the second target pressure while the compensation pressure increases, and determines whether the summed pressure becomes equal to the first target pressure.

When it is determined that the summed pressure is equal to the first target pressure, the processor 171 maintains the compensation pressure.

That is, the processor 171 may control the motor 155b to generate the same compensation pressure from a second time point at which the summed pressure becomes equal to the first target pressure.

The same compensation pressure is the pressure corresponding to the difference between the first target pressure and the second target pressure.

The processor 171 may maintain the compensation pressure from the second time point t2 to a third time point t3 at which the pressing of the brake pedal 131 ends and reduce the compensation pressure in proportion to a reduction in the first target pressure from the third time point to a fourth time point t4 at which the braking ends.

The processor 171 may adjust the compensation pressure from the first time point t1 to the fourth time point at which the braking ends.

In addition, the processor 171 may also compensate the second target pressure when it is determined that the current temperature is lower than the second temperature.

That is, the processor 171 may control the motor 155b to generate a pressure obtained by summing the compensation pressure and the second target pressure.

When the difference value is less than the reference value, the processor 171 may control the motor based on the pedal force signal of the pedal force detector.

The processor 171 may also control the motor based on the pedal force signal of the pedal force detector when it is determined that the current temperature is higher than or equal to the first temperature.

The memory 172 may store information on the first and second temperatures.

The memory 172 stores the first target pressure information.

The memory 172 may store information on reference values for each first target pressure.

The memory 172 may store the pedal force information corresponding to force information.

The memory 172 may store the pedal force information corresponding to load information.

The memory 172 may store the pedal force information corresponding to angle information.

The memory 172 may store the pedal force information corresponding to displacement information.

The memory 172 may store the stroke information corresponding to the pedal force information.

The memory 172 may store programs and data for braking the vehicle 1 depending on the user's braking intention. For example, the memory 172 may store programs and data for controlling the motor 155b and the valves based on the output of the pedal force detector 162.

The memory 172 may be implemented as at least one of non-volatile memory devices, such as a cache, a read only memory (ROM), a programmable ROM (PROM), an erasable PROM (EPROM), an electrically EPROM (EEPROM), and a flash memory, volatile memory devices, such as a random access memory (RAM), and storage media, such as a hard disk drive (HDD) and a CD-ROM, but is not limited thereto.

The memory 172 with regard to the processor 171 may be a memory implemented as a separate chip from the processor described above or may also be implemented as a single chip including the processor.

The electronic control unit 170 performs a function of a vehicle attitude stability control (ESC or electronic stability program (ESP)) of controlling a driving force and a braking force to prevent a vehicle from slipping while traveling based on the detection information detected by each detector while traveling and a function of the EPB controlled electronically unlike a wire type.

The electronic control unit 170 may further perform a function of the ABS for preventing the wheel lock of the wheels upon braking to shorten a braking distance and secure vehicle attitude stability and a function of the TCS for controlling the driving force so that the wheels do not idle by generating an excessive driving force when the vehicle starts or accelerates on a slippery road surface, such as a snowy road or a rainy road.

The electronic control unit 170 may include a signal processor for converting an analog signal into a digital signal when the analog signal for the detection information is transmitted from at least one of the plurality of detectors.

The motor driver 173 transmits the control signal of the processor 171 to the motor 155b.

When the brake pedal 131 is pressurized or the wheels slip, the motor driver 173 drives the motor 155b based on the control signal from the processor 171 to adjust the hydraulic pressure supplied to the wheel cylinder of each wheel.

The motor driver 173 may include six switching elements (i.e., a three-phase full bridge inverter) for supplying a three-phase power.

The vehicle may further include a current detector 155e for detecting a current of the motor 155b and a position detector for detecting a position of the motor 155b.

Current information detected by the current detector 155e and position information detected by the position detector may be used as information for controlling the motor 155b.

The position detector of the motor 155b may detect a position of a rotor of the motor 155b to supply a current suitable for a present position of the rotor.

The position detector detects the position of the rotor in order to accurately synchronize phases of magnetic fields generated at a position of a magnetic pole of a stator of the motor 155b and the position of the rotor and match the phase of the current supplied to a second motor with the position of the mechanical magnetic pole of the second motor.

At this time, the processor 171 may control the driving of the second motor based on the current information and the position information detected through the current detector and the position detector.

The motor 155b is a motor for adjusting the hydraulic pressure of the oil supplied from the hydraulic pressure supply device of the brake system 150 provided to each of the plurality of wheels to the wheel cylinder and may be rotated by the control command from the electronic control unit 170.

The valves 154a, 154b, V11 to V14, V21 to V24, V31 to V34, V41 to V46, V51 to V53, 157a, and 157b are provided in the brake system 150, may be opened or closed by the control command of the electronic control unit 170, and may adjust each hydraulic pressure of the oil supplied to each wheel cylinder by adjusting an opening when opened.

The valve driver 174 operates at least one of the plurality of valves based on the control signal from the processor 174 to adjust the hydraulic pressure of the wheel cylinder 153 provided on each wheel. That is, the valve driver 174 drives each of a plurality of solenoid valves.

That is, the electronic control unit 170 performs control of maintaining the traveling direction of the vehicle desired by the user while communicating with the EMS for electronic control of the engine, the TCU for controlling the automatic transmission so that an optimal transmission is possible using each piece of information according to the traveling situation of the vehicle, and the like via a CAN bus.

In addition, when the electronic control unit 170 perform only the vehicle attitude stability control and the parking brake control, as other systems, the ABS and the TCS may be further included.

As is apparent from the above description, by performing the attitude stability control and the braking control using one electronic control unit 170, it is possible to simplify the configuration and significantly reduce manufacturing costs of the electronic control unit 170.

According to the present disclosure, a braking force can be generated by compensating for a target pressure so that a user can feel similar deceleration with respect to the same pedal force.

According to the present disclosure, by increasing a braking pressure even in a situation in which a braking force cannot be generated because the brake pedal does not move well, it is possible to ensure the stability of the user.

According to the present disclosure, by integrally controlling the brake devices to share redundant hardware, it is possible to eliminate the redundant hardware, thereby reducing manufacturing costs of the electronic control unit and minimizing labor and time consumption during manufacturing.

According to the present disclosure, it is possible to simplify a configuration of the electronic control unit for a vehicle, reduce the use of a physical space, significantly reduce manufacturing costs of the electronic control unit, reduce a size and a weight of the electronic control unit, reduce the complexity of internal wiring of the vehicle, and reduce the manufacturing costs due to the simplification of the wiring.

According to the present disclosure, it is possible to increase the marketability of the vehicle, furthermore increase user satisfaction, and secure product competitiveness.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A brake system comprising:
a pedal force detector configured to output a pedal force signal corresponding to pressing of a brake pedal of a vehicle;
a pressure detector configured to output a pressure signal corresponding to a pressure of a flow path connected to a wheel cylinder of the vehicle;
a motor configured to provide a pressure of a pressurizing medium to the wheel cylinder; and
a processor configured to:
acquire pressure information of the flow path based on the pressure signal of the pressure detector when receiving the pedal force signal of the pedal force detector,
acquire a difference value between the pressure of the flow path and a target pressure corresponding to the pedal force signal based on the pressure information of the flow path and pre-stored target pressure information,
acquire compensation pressure information based on the pressure information of the flow path and the pre-stored target pressure information when the acquired difference value is greater than or equal to a reference value, and
control the motor based on the acquired compensation pressure information,
wherein the processor is further configured to control the motor to:
generate a compensation pressure from a first time point at which the acquired difference value is greater than or equal to the reference value;
linearly increase the compensation pressure from the first time point;
maintain the compensation pressure when a pressure obtained by summing the compensation pressure and the pressure of the flow path is equal to or greater than a pre-stored target pressure while the compensation pressure linearly increases, wherein the maintained compensation pressure is a pressure at a second time point at which the summed pressure is equal to or greater than the pre-stored target pressure; and
reduce the compensation pressure in proportion to a reduction in the pre-stored target pressure from a third time point at which a pressurization of the brake pedal ends.

2. The brake system of claim 1, further comprising a temperature detector,
wherein the processor is configured to:
identify whether a current temperature is higher than or equal to a first temperature based on a temperature signal of the temperature detector when receiving the pedal force signal of the pedal force detector;
acquire the pressure information of the flow path based on the pressure signal of the pressure detector when identifying that the current temperature is higher than or equal to the first temperature; and
store the acquired pressure information of the flow path as the target pressure information.

3. The brake system of claim 2, wherein the processor is configured to control the motor based on the pedal force signal of the pedal force detector when identifying that the current temperature is higher than or equal to the first temperature.

4. The brake system of claim 1, further comprising a temperature detector,
wherein the processor is configured to:
identify whether a current temperature is lower than a second temperature based on a temperature signal of the temperature detector when receiving the pedal force signal of the pedal force detector; and control the motor based on the acquired compensation pressure information when identifying that the current temperature is lower than the second temperature.

5. The brake system of claim 4, wherein the processor is configured to control the motor based on the pedal force signal of the pedal force detector when identifying that the acquired difference value is smaller than the reference value.

6. The brake system of claim 1, further comprising a memory for storing information on different reference values for each target pressure.

7. The brake system of claim 1, wherein the pre-stored target pressure information includes a plurality of pressure values corresponding to a plurality of pedal force signals.

8. A vehicle comprising:
a brake pedal;
a brake system including a motor configured to provide a pressure of a pressurizing medium to a wheel cylinder;
a pedal force detector configured to output a pedal force signal corresponding to pressurization of the brake pedal;
a pressure detector configured to detect a pressure of a flow path connected between the wheel cylinder and the motor; and
a processor configured to:
acquire pressure information of the flow path based on a pressure signal of the pressure detector when receiving the pedal force signal of the pedal force detector,
acquire a difference value between the pressure of the flow path and a target pressure corresponding to the pedal force signal based on the pressure information of the flow path and pre-stored target pressure information,
acquire compensation pressure information based on the pressure information of the flow path and the pre-stored target pressure information when the acquired difference value is greater than or equal to a reference value, and
control the motor based on the acquired compensation pressure information,
wherein the processor is further configured to control the motor to:
generate a compensation pressure from a first time point at which the acquired difference value is greater than or equal to the reference value;
linearly increase the compensation pressure from the first time point;
maintain the compensation pressure when a pressure obtained by summing the compensation pressure and the pressure of the flow path is equal to or greater than a pre-stored target pressure while the compensation pressure linearly increases, wherein the maintained compensation pressure is a pressure at a second time point at which the summed pressure is equal to or greater than the pre-stored target pressure; and
reduce the compensation pressure in proportion to a reduction in the pre-stored target pressure from a third time point at which a pressurization of the brake pedal ends.

9. The vehicle of claim 8, further comprising a temperature detector,
wherein the processor is configured to:
identify whether a current temperature is higher than or equal to a first temperature based on a temperature signal of the temperature detector when receiving the pedal force signal of the pedal force detector;
acquire the pressure information of the flow path based on the pressure signal of the pressure detector when identifying that the current temperature is higher than or equal to the first temperature; and
store the pressure information of the flow path as the target pressure information.

10. The vehicle of claim 9, wherein the processor is configured to control the motor based on the pedal force signal of the pedal force detector when identifying that the current temperature is higher than or equal to the first temperature.

11. The vehicle of claim 8, further comprising a temperature detector,
wherein the processor is configured to:
identify whether a current temperature is lower than a second temperature based on a temperature signal of the temperature detector when receiving the pedal force signal of the pedal force detector; and
control the motor based on the acquired compensation pressure information when identifying that the current temperature is lower than the second temperature.

12. The vehicle of claim 11, wherein the processor is configured to control the motor based on the pedal force signal of the pedal force detector when identifying that the acquired difference value is smaller than the reference value.

13. The vehicle of claim 8, further comprising a memory for storing information on different reference values for each target pressure.

14. The vehicle of claim 8, wherein the pre-stored target pressure information includes a plurality of pressure values corresponding to a plurality of pedal force signals.

15. A method of controlling a brake system including a motor configured to provide a pressure of a pressurizing medium to a wheel cylinder of a vehicle, the method comprising:
acquiring pressure information of a flow path based on a pressure signal corresponding to a pressure of the flow path connected to the wheel cylinder of the vehicle when receiving a pedal force signal corresponding to pressurization of a brake pedal of the vehicle;
acquiring a difference value between the pressure of the flow path and a target pressure corresponding to the pedal force signal based on the pressure information of the flow path and pre-stored target pressure information;
acquiring compensation pressure information based on the pressure information of the flow path and the pre-stored target pressure information when the acquired difference value is greater than or equal to a reference value; and
controlling the motor based on the acquired compensation pressure information,
wherein the acquiring of the compensation pressure information includes:
generating a compensation pressure from a first time point at which the acquired difference value is greater than or equal to the reference value;
linearly increasing the compensation pressure from the first time point;
maintaining the compensation pressure when a pressure obtained by summing the compensation pressure and the pressure of the flow path is equal to or greater than a pre-stored target pressure while the compensation pressure linearly increases, wherein the maintained compensation pressure is a pressure at a second time point at which the summed pressure is equal to or greater than the pre-stored target pressure; and reducing the compensation pressure in proportion to a reduction in the pre-stored target pressure from a third time point at which a pressurization of the brake pedal ends.

\* \* \* \* \*